US009530409B2

(12) United States Patent
Bartnik (10) Patent No.: US 9,530,409 B2
(45) Date of Patent: Dec. 27, 2016

(54) EVENT-TRIGGERED HANDS-FREE MULTITASKING FOR MEDIA PLAYBACK

(71) Applicant: BlackBerry Limited, Waterloo (CA)

(72) Inventor: Grant Henry Robert Bartnik, Fergus (CA)

(73) Assignee: BlackBerry Limited, Waterloo, Ontario (CA)

( * ) Notice: Subject to any disclaimer, the term of this patent is extended or adjusted under 35 U.S.C. 154(b) by 437 days.

(21) Appl. No.: 13/747,978

(22) Filed: Jan. 23, 2013

(65) Prior Publication Data

US 2014/0207468 A1 Jul. 24, 2014

(51) Int. Cl.
*G10L 15/22* (2006.01)
*G06F 3/16* (2006.01)

(52) U.S. Cl.
CPC .............. *G10L 15/22* (2013.01); *G06F 3/167* (2013.01); *G10L 2015/228* (2013.01)

(58) Field of Classification Search
CPC ............................... G10L 15/222; G06F 3/167
See application file for complete search history.

(56) References Cited

U.S. PATENT DOCUMENTS

| | | | |
|---|---|---|---|
| 5,450,525 A * | 9/1995 | Russell et al. ................ | 704/275 |
| 6,018,711 A * | 1/2000 | French-St. George . | G10L 15/22 455/231 |
| 6,345,254 B1 | 2/2002 | Lewis et al. | |
| 6,542,868 B1 * | 4/2003 | Badt et al. .................... | 704/270 |
| 7,454,351 B2 | 11/2008 | Jeschke et al. | |
| 7,457,755 B2 | 11/2008 | Konig | |
| 7,949,106 B2 * | 5/2011 | Erhart et al. ................ | 379/88.16 |
| 8,805,690 B1 * | 8/2014 | Lebeau et al. ................ | 704/275 |
| 8,977,255 B2 * | 3/2015 | Freeman ........... | H04W 52/0254 455/425 |
| 2002/0133355 A1 * | 9/2002 | Ross et al. .................... | 704/275 |

(Continued)

FOREIGN PATENT DOCUMENTS

| | | |
|---|---|---|
| EP | 2760015 | 7/2014 |
| GB | 2472482 A | 2/2011 |
| WO | 9403020 | 2/1994 |

OTHER PUBLICATIONS

Lin, et al. ; Poster Abstract: Proximity-Triggered Speech Recognition in Mobile Cloud Computing; published on Apr. 16-20, 2012.

(Continued)

*Primary Examiner* — Brian Albertalli
(74) *Attorney, Agent, or Firm* — Fish & Richardson P.C.

(57) ABSTRACT

A system and method are provided for hands-free operation of a device based on a context of an event. An example system configured to practice the method can detect an event during playback of media content to a user, and optionally output a first audible indication of the event. Based on the event, the system can activate a speech recognition application using a custom speech recognition grammar for recognizing a set of speech commands associated with the event. Then the system can optionally output a second audible indication of readiness to process speech in association with the event. The system can monitor, for a predetermined duration of time after the second audible indication, audio input received via the microphone to recognize a command via the speech recognition application, and execute the command.

17 Claims, 4 Drawing Sheets

(56) References Cited

U.S. PATENT DOCUMENTS

| | | |
|---|---|---|
| 2003/0046076 A1* | 3/2003 | Hirota et al. .................. 704/258 |
| 2003/0171928 A1* | 9/2003 | Falcon et al. .................. 704/275 |
| 2005/0114140 A1 | 5/2005 | Brackett et al. |
| 2006/0085199 A1 | 4/2006 | Jain |
| 2006/0287864 A1 | 12/2006 | Pusa et al. |
| 2007/0015486 A1 | 1/2007 | Marlowe |
| 2007/0073543 A1* | 3/2007 | Hammler ............ B60R 16/0373 704/275 |
| 2007/0143115 A1* | 6/2007 | Falcon et al. .............. 704/270.1 |
| 2007/0274296 A1* | 11/2007 | Cross et al. .................. 370/356 |
| 2008/0103777 A1 | 5/2008 | Surace et al. |
| 2008/0208584 A1* | 8/2008 | Ativanichayaphong et al. ............................ 704/260 |
| 2009/0064155 A1* | 3/2009 | Giuli et al. ................... 718/103 |
| 2009/0182560 A1 | 7/2009 | White |
| 2009/0313010 A1* | 12/2009 | Burckart et al. .............. 704/227 |
| 2009/0326928 A1* | 12/2009 | Omiya et al. .............. 704/200.1 |
| 2010/0137037 A1* | 6/2010 | Basir .......................... 455/569.1 |
| 2010/0219971 A1* | 9/2010 | Appelman et al. ........ 340/691.3 |
| 2010/0330975 A1* | 12/2010 | Basir ............................. 455/418 |
| 2011/0010180 A1 | 1/2011 | Agapi et al. |
| 2011/0201385 A1* | 8/2011 | Higginbotham .............. 455/563 |
| 2011/0301958 A1 | 12/2011 | Brush et al. |
| 2012/0022872 A1* | 1/2012 | Gruber .................... G10L 15/22 704/270.1 |
| 2012/0052907 A1 | 3/2012 | Gilbreath et al. |
| 2012/0116777 A1* | 5/2012 | Wistrand ................... 704/270.1 |
| 2013/0080178 A1* | 3/2013 | Kang et al. .................. 704/275 |
| 2013/0322634 A1* | 12/2013 | Bennett et al. .................. 381/17 |
| 2014/0052438 A1* | 2/2014 | Yerrace et al. ............... 704/201 |
| 2014/0067403 A1* | 3/2014 | Burke et al. .................. 704/275 |
| 2014/0074483 A1* | 3/2014 | van Os ......................... 704/275 |
| 2014/0123008 A1* | 5/2014 | Goldstein ..................... 715/716 |
| 2014/0207468 A1 | 7/2014 | Bartnik |

OTHER PUBLICATIONS

Office Action mailed Nov. 18, 2014; in Canadian patent application No. 2,837,291.

Extended European Search report mailed Jul. 18, 2013, in corresponding European patent application No. 13152427.4.

* cited by examiner

EVENT-TRIGGERED HANDS-FREE MULTITASKING FOR MEDIA PLAYBACK

FIELD OF TECHNOLOGY

The present disclosure relates generally to hands free interactions, and more specifically to a system and method for enabling context-sensitive hands free interactions based on occurrence of an event.

BACKGROUND

Electronic devices, such as tablet computers and smartphones, can play media content such as audio and video content. Often devices stream media content from a remote source, but media content can also be stored locally. However, smartphones and other devices that can play media, also often have active data connections, such as via a cellular network or a local 802.11 Wi-Fi network. Such devices can receive other communications, such as an email, instant message, incoming telephone call, and so forth, while playing back media content. These other communications can interrupt the playback, and can require the user to interact with the device manually to resume playback.

For example, while using a device to stream audio from a remote server, the user can place the device out of arms' reach or in an otherwise inaccessible spot. If for some reason the streaming playback is interrupted, such as by the user accepting an incoming phone call, there is no convenient way to instruct the device to attempt to resume playback at the same timestamp without the user picking up and interacting with the device. Similarly, if the user receives an instant message during media playback, the user has no way to instruct the device to act upon the events without picking up and interacting with the device. In another example, a user is driving a vehicle while the device is linked to the vehicle, such as via Bluetooth. In this situation, the driver should not be distracted by picking up the device to manually restart a stream or otherwise interact with the device in order to respond to an event.

Simply enabling speech recognition and voice control is not an adequate solution, because that would require the device to listen for the entire duration of the media playback, and consequently require filtering of background noise generated by the device itself. Bluetooth integration can address part of this problem, such as allowing a user to answer phone calls depending on the degree of integration in the vehicle, but many simple actions still require the user to pick up and interact with the device. These and other problems exist for hands-free device interaction.

BRIEF DESCRIPTION OF THE DRAWINGS

A description is provided herein with reference to specific examples illustrated in the appended drawings. These drawings depict only example implementations of the disclosure and are not intended to limit the scope of the disclosure.

DETAILED DESCRIPTION

Various examples are provided herein. While specific examples are discussed, it should be understood that this is for illustration purposes only. A person skilled in the relevant art will recognize that other components and configurations may be used without departing from the spirit of the disclosure.

Several definitions that apply throughout this document are now presented. The phrase "coupled" is defined as connected, whether directly or indirectly through intervening components, and is not necessarily limited to physical connections. Coupled devices are devices which are in signal communication with one another.

The term "electronic device" is defined as any device that is capable of at least accepting data, transmitting data, and executing commands. For example, electronic devices may include, but are not limited to, portable communication devices, mobile communication devices, mobile computers, smartphones, computing pads, tablet computers, personal computers, desktop computers, laptop computers, netbooks, servers, routers, set-top phones, or other electronic devices capable of at least accepting data, transmitting data, and executing commands.

The term "media content" can be defined as any audio, video, audiovisual content, or the like. Media content may include, but is not limited to, music, movies, animation, ringtones, portions of music, portions of videos, or the like. Media content can be streamed from a network location for playback or played from a local storage device, for example. Media content can be embedded within an application or software package.

Systems and methods are provided for enabling hands-free use of a device based on a context of an event. In one example embodiment, during playback of the media content to a user, the device detects an event, such as an incoming email message or telephone call. The device can output a first audible indication of the event, such as playing an audio file or generating synthetic speech describing the event. Based on the event, the device can activate a speech recognition engine using a custom speech recognition grammar for recognizing a set of speech commands associated with the event, or can execute a speech recognition application to process speech commands associated with the event. For example, if the event is an incoming telephone call, the set of speech commands associated with the event can include "answer", "forward to voicemail", "ignore", or "ignore and send text message". The custom speech recognition grammar or speech recognition application can be tuned to specifically recognize these phrases, related phrases, or combinations thereof. The device can optionally output a second audible indication of readiness to process speech in association with the event, such as an audible ding, beep, audio file, or synthetic speech. The audible indications can be an audio overlay on top of media playback. Then the device can monitor, for a predetermined duration of time after the second audible indication and/or after the event, audio input received via the microphone to recognize a command via the speech recognition engine. In this manner, the device implements a timed recognition of audio commands.

Prior to executing the command, the device can optionally pause playback of the media content, and then execute the command. After executing the command, the device can resume playback of the media content automatically or perform some other action indicated by the user. In this way, the user can easily interact with the device via a speech interface tuned specifically to commands based on an expected context of a detected event. While the examples set forth herein primarily discuss event and context based hands-free speech interfaces in terms of events that interrupt media playback, similar principles also apply to hands-free interfaces based on detected events regardless of media playback.

In one scenario, the approaches set forth herein can give the user an extra option when initiating playback of streaming media for an "enhanced hands free playback mode". For example, the playback device can present a special "Play" functionality via a key with a symbol in the top corner, which the user can access by tapping and holding down a traditional play button for 2-3 seconds. When operating in this special "Play" mode, if a stream stops for some reason and must be halted, the device will emit an audible tone indicating that for some time period, such as 10 seconds, the device can recognize and accept relevant voice commands, like "restart". Then, when the device receives and decodes these commands correctly, the device can present another tone indicating the command was understood and is being executed. An alarm tone can indicate that the command was not understood or is incapable of execution. Similarly, when operating in enhanced playback mode, if configured, when an email or instant message arrives, a different tone can be overlaid on top of the existing stream (or the stream could be paused, depending on the configuration), prompting the hands-free user to instruct the device to dictate the new event and optionally the contents or perform some other action with respect to the event. After dictation of the event and/or contents completes, a tone could prompt the user to enter the next command, at which time the user could say "resume stream". At this point, the stream resumes. Alternatively, the user could instruct the device to use speech processing to craft a reply. In one example, the device does not rely on the user to activate the "enhanced hands free media playback mode" explicitly, but rather the device can utilize sensors, such as touch-screen, proximity, accelerometer, or gyroscope, to sense when the device is in an inactive mode. The inactive mode can indicate, for example, that the device is not being interacted with for a certain period of time. The device can automatically activate a hands free media playback mode, or other hands-free state, based on the input from such sensors.

The system can automatically resume streaming media playback after an interrupting event. The system can provide notifications of an incoming event as an audible alert laid on top of media playback or that interrupts media playback. The system can acknowledge whether hands-free commands are understood, accepted, and/or capable of execution. Further, the system can provide some indication of an outcome or result of executing a received hands-free command.

When the device is doing something passive and the user is interacting, if at all, in a hands-free mode, such as playing streaming media, events can be classified in to one of two categories: disruptive events and user-initiated events. An incoming email is an example of a disruptive event. An example of a user-initiated event is user input to switch streaming radio stations. An interruptive event can stop the media and enable a contextual voice recognition parser to interpret the dispatching of that interruption, such as read an email, or answer an incoming phone call. In a user-initiated event, the user indicates through some mechanism, either a button press or a unique sound such as a hand clap that enables a similar mode for switching stations, adjusting parameters, or shuttle control.

Figure 1:
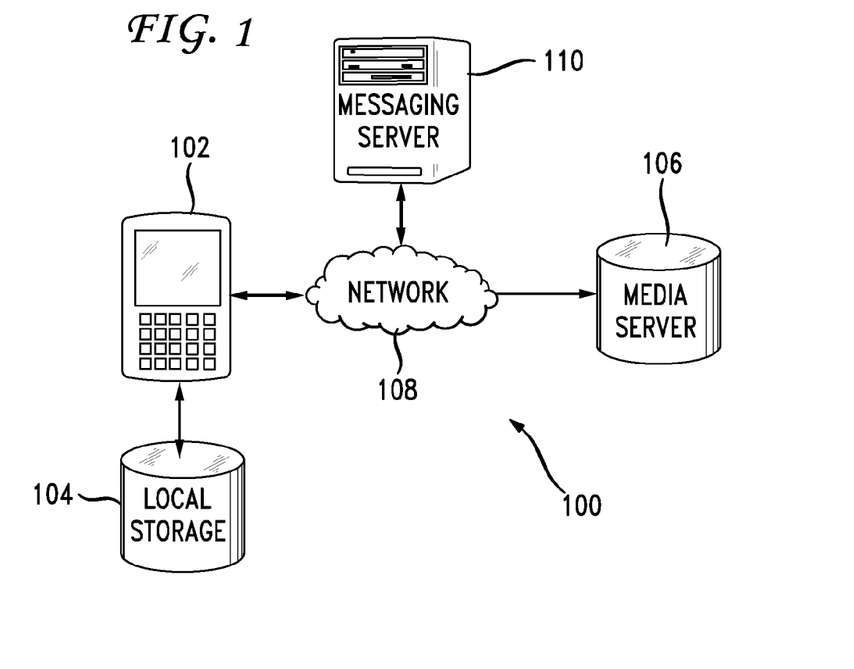
FIG. 1 shows an example media playback device.

FIG. 1 shows an example arrangement 100 of a media playback device 102. The media playback device 102 may be a portable communication device, a mobile communication device, a mobile computer, a smartphone, a computing pad, a tablet computer, a personal computer, a desktop computer, a laptop computer, a netbook, a set-top phone, a portable digital assistant (PDA), a DVD player, a portable Blu-ray® player, a network television, an audio-playback device, a portable music player, or other electronic device capable of at least accepting data, transmitting data, and executing commands. The media playback device 102 can include a non-transitory or a transitory computer-readable storage medium that can be internal, external, portable, or detachable. For example, the computer-readable storage medium may be any available media that may be accessed by a general purpose or special purpose computer, including the functional design of any special purpose processor. By way of example, and not limitation, such non-transitory computer-readable media may include RAM, ROM, EEPROM, CD-ROM or other optical disk storage, magnetic disk storage or other magnetic storage devices, flash memory, or any other medium which may be used to carry or store desired program code in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium.

According to one example, the media playback device 102 may be a smartphone and may include at least one processor configured to execute instructions for playing back media, processing speech or other hands-free input, and executing commands associated with events. The media playback device 102 may include a display, an audio output module, an input processing module, and a network interface. The audio output module may store a media player application to play media content including audio files, video files, and so forth. In other implementations, the audio output module may be an Internet application module that supports a web-based media player, a presentation application module that supports audiovisual files, or any other application module for playing media files.

The media playback device 102 may include a peer-to-peer connector, such as a peer-to-peer (P2P) device pairing interface, a Bluetooth® interface, a near-field-communication (NFC) interface, a near-field-communication-peer-to-peer (NFC P2P) interface, a Wi-Fi-interface, a tether interface, or any other device or interface which allows the media playback device 102 to transmit or receive data, such as media content, and receive data from a messaging server 110 or other event source. While the media playback device 102 is described herein in terms of a particular set of components, those of ordinary skill in the art will appreciate that the media playback device 102 may have fewer or more components than discussed herein, without departing from the technical advantages of the present systems and methods of hands-free handling of incoming events.

In this example, the media playback device can play media from a local storage 104 or streaming from a media server 106 over a wired or wireless network 108. One such example is a smartphone streaming music from an online service. The media playback device 102 can communicate with a messaging server 110, such as a short messaging service (SMS) server, a voice over IP (VoIP) server, an email server, or other similar entity. When the media playback device 102 receives an incoming email, for example, during media playback, the media playback device 102 can go through the interactions set forth in FIG. 2.

Figure 2:
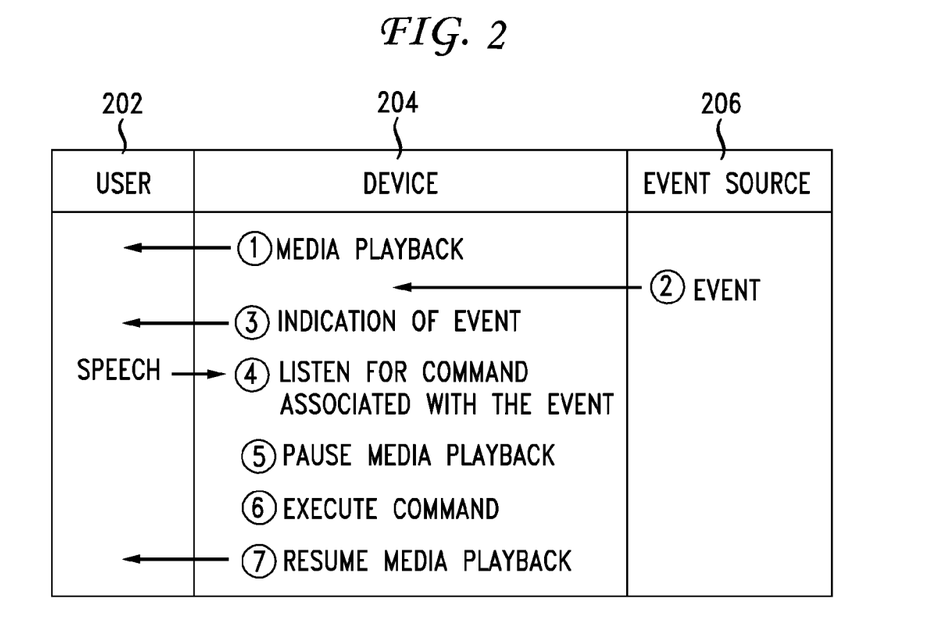
FIG. 2 shows an example set of interactions between a user, a media playback device, and an event source.

FIG. 2 shows an example set of interactions 200 between a user 202, a media playback device 102, and an event source 206. At step 1, the device 102 plays media content to the user 202. At step 2, the event source 206 sends an event to the device 102. While the example event source 206 can be external, such as messaging server 110 as shown in FIG. 1, the event source 206 can alternatively be internal to the device 102, such as a calendar reminder. The device 102 can monitor actively for events from the event source 206, or the event source 206 can push event notifications to the device 102. At step 3, the device 102 can provide an indication of the event to the user 202. In some cases, the device 102 processes multiple events from multiple sources, and only certain events trigger indications to the user 202. At step 4 after the indication, the device 102 listens for speech commands, or monitors for other hands-free commands, associated with the event. The device 102 can activate or load a custom speech recognition module or engine to recognize a specific set of speech commands for handling the event or that are associated with the event. Alternatively, the device 102 can load a gesture recognition engine, for example, to recognize hands-free gesture commands. The device 102 can activate the recognition module for a predetermined time after notification of the event or after the indication of the event. If the user does not provide any recognizable input within the predetermined time, the device 102 continues with normal media playback, essentially reverting back to step 1. If, on the other hand, the user provides a recognizable input that translates to a command, the device 102 at step 5 can pause the media playback, execute the command at step 6, and resume media playback at step 7.

Figure 3:
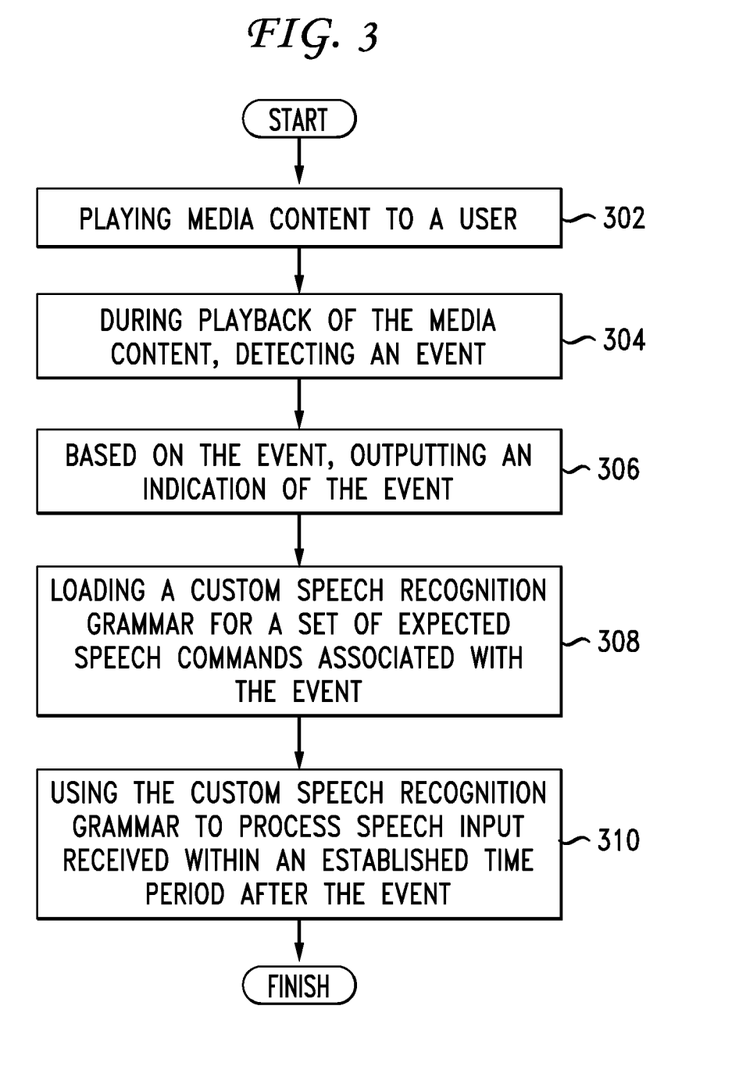
FIG. 3 shows an example simplified process for processing speech commands based on an event context.
Figure 4:
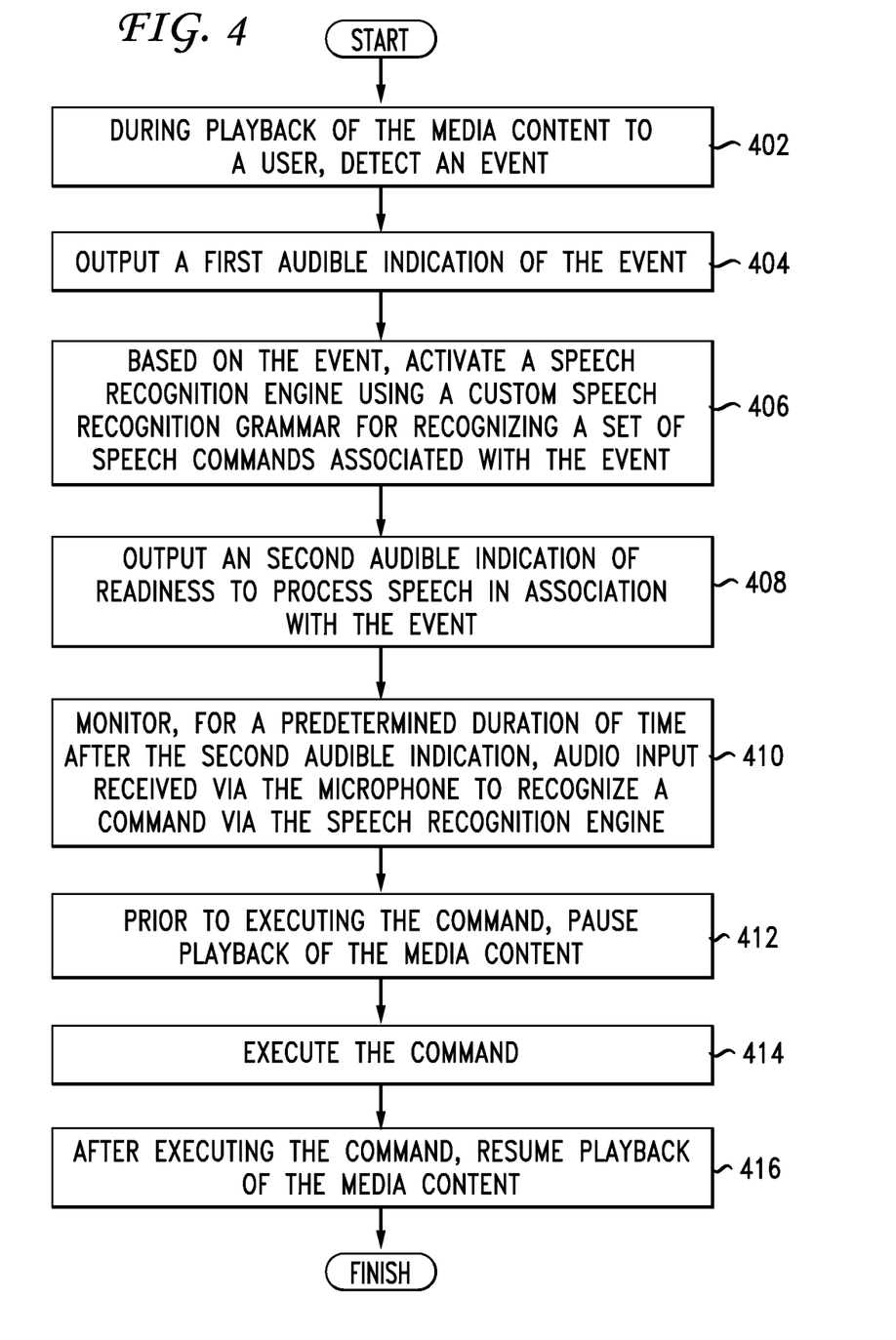
FIG. 4 shows a more detailed example process for processing speech commands based on an event context.

Various examples of methods and systems for event-driven hands-free device operation are described with reference to FIGS. 3-4. While FIGS. 3-4 illustrate a particular order of steps, one of ordinary skill in the art will appreciate that the steps may be executed in any order to accomplish the technical advantages of the present disclosure and may include fewer or more steps than illustrated or may modify the illustrated steps. Each block represents one or more processes, methods, or subroutines. The steps may be implemented in a system such as a mobile electronic device, a server, a media streaming device, smartphone, electronic tablet, stereo system, automobile stereo or any other type of electronic device capable of at least accepting data, transmitting data, and executing commands. Each block shown in FIGS. 3-4 may be carried out by a processor 520 of the example electronic device 500. The processor 520 illustrated in FIG. 5 may include one or more processors or one or more processing systems. The flow charts illustrated in FIGS. 3-4 will be described with reference to the device 500 shown in FIG. 5. FIGS. 3 and 4 are discussed in terms of playing media content to a user, such as playing local content or streaming network content. However, the principles discussed, specifically activating speech recognition based on a focused speech recognition grammar related to an event for enabling hands-free operation of a device, are also applicable to other hands-free usage scenarios besides simply streaming media content.

FIG. 3 shows an example simplified process for processing speech commands based on an event context. The process is described in terms of a system, such as a mobile phone, configured to practice the process. While playing media content to a user in operation 302, the system can detect an event in operation 304. The event can be an incoming message, an incoming call, a user-initiated event, a calendar event, or a reminder, for example. Based on the event, the system can output an indication of the event in operation 306, such as an audible alert, a visible notification on screen, or via a notification LED, for example. The indication of the event can also be a vibration of a mobile device 102 or some other tactile indication. The indication can be a combination of one or more of these outputs. The indication of the event can be output by the device 102 itself or another separate device. The system can load a custom speech recognition grammar for a set of expected speech commands associated with the event in operation 308. The expected speech commands can be based on the event and a user activity when the event occurred.

Then, using the custom speech recognition grammar, the system can process speech input received within an established time period after the occurrence of event in operation 310. The duration of the established time period can be based on an event type. The established time period can start after the event ends, after a notification, or at some other time which can be fixed or can be user-configurable. The system can identify a recognized speech command uttered during the established time period. The recognized speech command is obtained from the expected speech commands received from the speech input and processed using the custom speech recognition grammar. Then the system can pause the playback of the media content, execute the recognized speech command, and resume playback of the media content or optionally perform some other action.

In one embodiment, the system can output a second indication to the user of a state of readiness to accept speech commands. For example, the first indication can be a regular 'ding' or sound for an incoming email on a mobile device. The second indication can follow closely after the regular sound, and can indicate that the system is listening for the next 5 seconds, for example, for speech commands for handling the email just received. Upon hearing the second indication, the user can utter speech commands such as "read email", "reply", or "delete". The first indication and/or second indication can include details of the incoming message to provide some hands-free indication of the contents of the message. Alternatively, the system can receive non-speech hands-free commands, which may include input via hands-free or non-touch gestures or other alternative input devices.

Further, the first indication and/or second indication can provide information regarding which hands-free commands are available, whether by providing a short list of available commands or by providing one of a set of different indications, each associated with a different set of available commands. The system can output the first and second indications at the same time, back to back, or with a delay in between. Further, the device can output multimodal indications, where the first indication is of one type, such as an audible notification, and the second indication is of a different type, such as a vibration notification. The output mode, style, content, or other characteristics of the indications can vary based on the type, content, or other attributes of the event, such as a sender of an email or a key word in a text message. Indications can include a synthetic spoken prompt describing the event or at least one of the set of expected speech commands.

FIG. 4 shows a more detailed example process for processing speech commands based on an event context. During playback of media content to a user, the device can detect an event in operation 402. The device can output a first audible indication of the event in operation 404. Based on the event, the device can activate a speech recognition engine using a custom speech recognition grammar for recognizing a set of speech commands associated with the event in operation 406. The device can output a second audible indication of readiness to process speech in association with the event in operation 408. The device can monitor, for a predetermined duration of time after the second audible indication, audio input received via the microphone to recognize a command via the speech recognition engine in operation 410. Prior to executing the command, the device can pause playback of the media content in operation 412, execute the command in operation 414, and, after executing the command, resume playback of the media content in operation 416.

Figure 5:
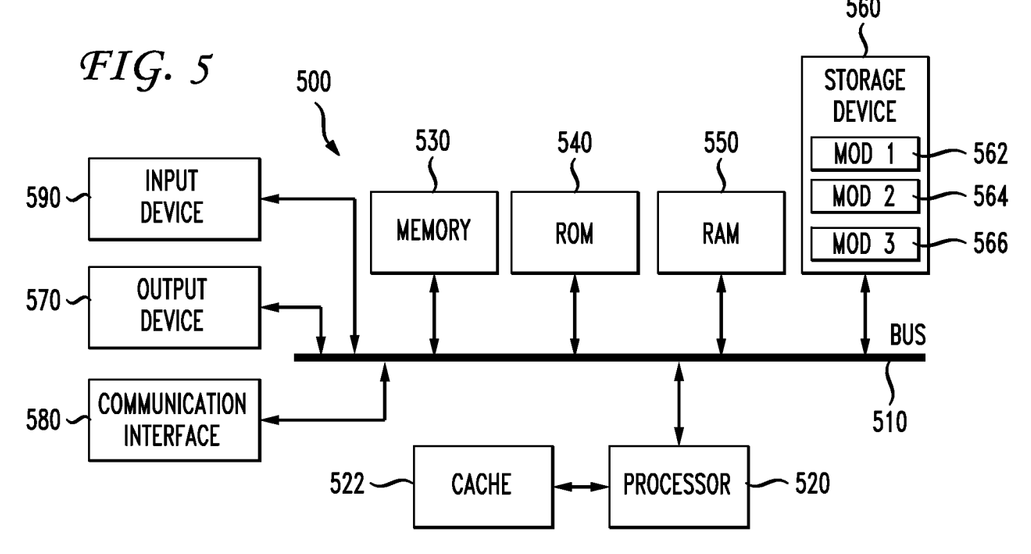
FIG. 5 illustrates a computing device system according to an example implementation.

The disclosure now turns to a brief description of a basic general purpose system or computing device, as shown in FIG. 5, which may be employed to practice the concepts disclosed herein. The components disclosed herein may be incorporated in whole or in part into handsets, transmitters, servers, and/or any other electronic or other computing device.

With reference to FIG. 5, an example system 500 includes a general-purpose computing device 500 or electronic device; including a processing unit (CPU or processor) 520 and a system bus 510 that couples various system components to the processor 520. The system components include a system memory 530 such as read only memory (ROM) 540 and random access memory (RAM) 550. The system 500 may include a cache 522 of high speed memory connected directly with, in close proximity to, or integrated as part of the processor 520. The system 500 copies data from the memory 530 and/or the storage device 560 to the cache 522 for quick access by the processor 520. In this way, the cache provides a performance boost that avoids processor 520 delays while waiting for data. These and other modules may control or be configured to control the processor 520 to perform various actions. Other system memory 530 may be available for use as well. The memory 530 may include multiple different types of memory with different performance characteristics. It may be appreciated that the disclosure may operate on a computing device 500 with more than one processor 520 or on a group or cluster of computing devices networked together to provide greater processing capability. The processor 520 may include any general purpose processor and a hardware module or software module, such as module 1 562, module 2 564, and module 3 566 stored in storage device 560 configured to control the processor 520 as well as a special-purpose processor where software instructions are incorporated into the actual processor design. The processor 520 may be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output system (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 may include software modules 562, 564, 566 for controlling the processor 520. Other hardware or software modules are contemplated. The storage device 560 is connected to the system bus 510 by a drive interface. The drives and the associated computer readable storage media provide non-volatile storage of computer readable instructions, data structures, program modules, and other data for the computing device 500. In one aspect, a hardware module that performs a particular function includes the software component stored in a non-transitory computer-readable medium in connection with the necessary hardware components, such as the processor 520, bus 510, display 570, and so forth, to carry out the function. The basic components are known to those of skill in the art and appropriate variations are contemplated depending on the type of device, such as whether the device 500 is a small, handheld computing device, a desktop computer, or a computer server.

Although the example described herein employs the hard disk 560, it should be appreciated by those skilled in the art that other types of computer readable media which may store data that are accessible by a computer, such as magnetic cassettes, flash memory cards, digital versatile disks, cartridges, random access memories (RAMs) 550, read only memory (ROM) 540, a cable or wireless signal containing a bit stream and the like, may also be used in the example operating environment. Non-transitory computer-readable storage media expressly exclude media such as energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 may also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

For clarity of explanation, the illustrative system example is presented as including individual functional blocks including functional blocks labeled as a "processor" or processor 520. The functions these blocks represent may be provided through the use of either shared or dedicated hardware, including, but not limited to, hardware capable of executing software and hardware, such as a processor 520, that is purpose-built to operate as an equivalent to software executing on a general purpose processor. For example the functions of one or more processors presented in FIG. 5 may be provided by a single shared processor or multiple processors. (Use of the term "processor" should not be construed to refer exclusively to hardware capable of executing software.) Illustrative examples may include microprocessor and/or digital signal processor (DSP) hardware, read-only memory (ROM) 540 for storing software performing the operations discussed below, and random access memory (RAM) 550 for storing results. Very large scale integration (VLSI) hardware examples, as well as custom VLSI circuitry in combination with a general purpose DSP circuit, may also be provided.

The logical operations of the various examples are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 500 shown in FIG. 5 may practice all or part of the recited methods, may be a part of the recited systems, and/or may operate according to instructions in the recited non-transitory computer-readable storage media. Such logical operations may be implemented as modules configured to control the processor 520 to perform particular functions according to the programming of the module. For example, FIG. 5 illustrates three modules Mod 1 562, Mod 2 564 and Mod 3 566 which are modules configured to control the processor 520. These modules may be stored on the storage device 560 and loaded into RAM 550 or memory 530 at runtime or may be stored as would be known in the art in other computer-readable memory locations.

Examples within the scope of the present disclosure may also include tangible and/or non-transitory computer-readable storage media for carrying or having computer-executable instructions or data structures stored thereon. Such non-transitory computer-readable storage media may be any available media that may be accessed by a general purpose or special purpose computer, including the functional design of any special purpose processor as discussed above. By way of example, and not limitation, such non-transitory computer-readable media may include RAM, ROM, EEPROM, CD-ROM, or other optical disk storage, magnetic disk storage or other magnetic storage devices, or any other medium which may be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply not only to a smartphone device but also to other devices capable of hands-free input such as a laptop computer. Those skilled in the art will readily recognize various modifications and changes that may be made to the principles described herein without following the example implementations and applications illustrated and described herein, and without departing from the scope of the disclosure.

I claim:

1. A method operable on an electronic device, comprising:
during media playback, detecting an event;
initiating output of a first indication of the event, wherein the first indication is a first audio overlay on top of the media playback and indicates that speech recognition is available for a predefined period of time;
determining an event type from a plurality of event types, wherein each of the plurality of event types is associated with a set of speech commands;
determining a set of speech commands associated with the event type;
executing a speech recognition application to process speech commands associated with the event and to provide options to the user for controlling the electronic device, wherein executing the speech recognition application includes initiating a speech recognition engine using the set of speech commands associated with the event type;
initiating output of a second indication of a state of readiness to process speech commands in association with the event, wherein the second indication is an audio overlay on top of the media playback;
identifying a recognized speech command from a set of expected speech commands using custom speech recognition grammar based on the event; and
in response to identifying the recognized speech command:
pausing the media playback; and
executing the recognized speech command.

2. The method of claim 1, further comprising:
after executing the recognized speech command, resuming the paused media playback.

3. The method of claim 1, wherein the indication of the event is at least one of a visible indication, a tactile indication, or an audible indication.

4. The method of claim 1, wherein a style of the second indication is based on a type of the event.

5. The method of claim 1, wherein a style of the indication is based on an event type.

6. The method of claim 1, wherein the speech commands are based on the event and a user activity when the event occurred.

7. The method of claim 1, wherein the speech recognition application processes speech commands within an established time period, and wherein the established time period is based on an event type.

8. The method of claim 7, wherein the established time period starts after the event ends.

9. The method of claim 1, wherein the indication of the event comprises a synthetic spoken prompt describing the event.

10. The method of claim 1, wherein the indication of the event indicates at least one of the speech commands.

11. The method of claim 1, wherein the event comprises at least one of an incoming message, an incoming call, a user-initiated event, a calendar event, or a reminder.

12. An electronic device comprising:
a microphone;
a processor that communicates with a computer-readable storage medium having instructions stored thereon that, when executed by the processor, cause the processor to:
during playback of media content to a user in a hands-free operation mode, detect an event;
initiate output of a first indication of the event, wherein the first indication is a first audio overlay on top of the media playback and indicates that speech recognition is available for a predefined period of time;
determine an event type from a plurality of event types, wherein each of the plurality of event types is associated with a set of speech commands;
determine a set of speech commands associated with the event type;
based on the event, execute a speech recognition application to process speech commands associated with the event, wherein executing the speech recognition application includes initiating a speech recognition engine using the set of speech commands associated with the event type;
initiate output of an indication of readiness to process speech commands in association with the event, wherein the indication is an audio overlay on top of the playback of media content;
monitor, for a predetermined duration of time after the event, audio input received via the microphone to recognize a command via the speech recognition application; and
in response to recognizing the command:
pause the playback of the media content; and
execute the command.

13. The electronic device of claim 12, wherein the instructions, when executed by the processor, further cause the processor to:
after executing the command, resume the paused playback of the media content.

14. The electronic device of claim 12, wherein the hands-free operation mode is entered based on sensor input other than an explicit user command.

15. A non-transitory computer-readable storage medium for transferring control of media playback between electronic devices, the non-transitory computer-readable storage medium comprising instructions that, when executed by an electronic device, cause the electronic device to:
during playback of media content to a user, detect an event;
initiate output of a first audible indication of the event wherein the first audible indication is a first audio overlay on top of the media playback and indicates that speech recognition is available for a predefined period of time;
determine an event type from a plurality of event types, wherein each of the plurality of event types is associated with a set of speech commands;
determine a set of speech commands associated with the event type;
based on the event, execute a speech recognition application to process speech commands associated with the event, wherein executing the speech recognition application includes initiating a speech recognition engine using the set of speech commands associated with the event type;
initiate output of a second audible indication of readiness to process speech commands in association with the event, wherein the second audible indication is an audio overlay on top of the playback of media content;
monitor, for a predetermined duration of time after the second audible indication, audio input received via the microphone to recognize a command via the speech recognition application; and
in response to recognizing the command:
pause the playback of the media content; and
execute the command.

16. The non-transitory computer-readable storage medium of claim 15, wherein at least one of style or content of the first audible indication is based on a type of the event.

17. The non-transitory computer-readable storage medium of claim 15, wherein the computer-readable storage medium stores further instructions that, when executed by the electronic device, cause the computing device to:
after executing the command, resume the paused playback of the media content.

* * * * *